United States Patent [19]

Schmidt et al.

[11] Patent Number: 4,720,522

[45] Date of Patent: Jan. 19, 1988

[54] WATER REDUCIBLE ALKYD VINYL COPOLYMER RESINS

[75] Inventors: Roger A. Schmidt, Chanhassen; Martin L. Hage, Maple Grove, both of Minn.

[73] Assignee: Cargill, Incorporated, Minneapolis, Minn.

[21] Appl. No.: 903,381

[22] Filed: Sep. 3, 1986

[51] Int. Cl.$^4$ .................. C08G 63/76; C08L 67/00; C08F 8/00

[52] U.S. Cl. ............................ 525/43; 524/599; 525/170; 528/295.5; 528/303; 528/304

[58] Field of Search .............. 525/43, 170; 528/295.5, 528/303, 304; 524/599

[56] References Cited

U.S. PATENT DOCUMENTS

| | | | |
|---|---|---|---|
| 3,600,345 | 8/1971 | Levine et al. | 525/170 X |
| 4,294,748 | 10/1981 | Corrado et al. | 525/43 X |
| 4,540,741 | 9/1985 | Corrado | 525/43 |
| 4,555,564 | 11/1985 | Fischer et al. | 528/295.3 |

*Primary Examiner*—Lucille M. Phynes
*Attorney, Agent, or Firm*—Fitch, Even, Tabin & Flannery

[57] ABSTRACT

A water reducible alkyd vinyl copolymer resin having an acid number in the range of from about 30 to about 70, a method for making the copolymer resin and coating compositions which include the resin are described wherein the copolymer resin is the reaction product of from about 10 to about 90 percent by weight, based upon the weight of monomers and initiator which provide the alkyd vinyl copolymer resin, of an alkyd resin which is the product of a polymerization reaction and which has an acid number in the range of from about 30 to about 70; and from about 10 to about 90 percent by weight based upon the weight of the monomers and initiator which provide the alkyd vinyl copolymer resin, of a vinyl resin which has an acid number in the range of about 30 to about 70. The vinyl resin and the alkyd resin each have acid numbers within 50 percent of the acid number of the alkyd vinyl copolymer resin, and the polymerization reaction for the alkyd resin is carried out in the presence of the vinyl resin, or the reaction for the vinyl resin is carried out in the presence of the alkyd resin to provide the alkyd vinyl copolymer resin.

30 Claims, No Drawings

WATER REDUCIBLE ALKYD VINYL COPOLYMER RESINS

This invention is directed to new water reducible alkyd vinyl copolymer resins for use as a binder in coating compositions, a method for the preparation of such resins and coating compositions which include such resins. More specifically, alkyd vinyl copolymer resins of this invention are not only reducible or miscible in water, but provide improved film properties for coating compositions using the resins as a binder.

Environmental concern has become increasingly important in recent years. This concern not only extends to preservation of the environment for its own sake, but extends to safety for the public as to both living and working conditions. Volatile organic emissions resulting from coating compositions which are applied and used by industry and by the consuming public are often not only unpleasant, but may contribute to photochemical smog. Fire and health hazards of organic solvents also are well known. Governments may or have established regulations setting forth guidelines relating to volatile organic compounds (VOCs) which may be released to the atmosphere. The United States Environmental Protection Agency (EPA) has established guidelines relating to the amount of VOCs released to the atmosphere, such guidelines being scheduled for adoption by the States of the United States. Guidelines relating to VOCs, such as those of the EPA, and environmental concerns are particularly pertinent to the paint and industrial coating industry which uses organic solvents which are emitted into the atmosphere.

With respect to coating compositions, and in response to environment concern, organic coating resins, and most particularly alkyd coating resins have been developed and are known to reduce organic emissions with the use of water or an organic solvent/water combination in lieu of using volatile organic solvents without water.

Moving from organic solvents to water or a water/organic solvent combination often not only requires changes in the constituents of the binder resin, but frequently adversely affects film properties of the coating composition based upon the binder resin. For example, using water as a solvent changes the curing and/or solvent retention characteristics of the coating compositions which contain the coating resin or binder. Often water as a solvent in these coating compositions will cause inconsistent drying rates with varying humidity and lengthen the drying times of films of these coating compositions which causes inefficiencies and dirt pick up during drying.

Generally air-drying alkyd coatings on metal will blister such films if they are recoated within about a three day period. This is thought to be caused by solvent penetration into the base coat and probably relates to incomplete cure or a fast cure on the surface of the coat and/or solvent retention in the base coat. Where second and third coats are required there is an obvious efficiency advantage in being able to add these additional coats of coating composition as soon as possible after applying the base coat.

Enhancing water miscibility of a binder resin of a coating composition, however, generally will improve the stability of the resin and coating composition in water or in a water/organic solvent combination. Further, increased water miscibility facilitates pigmentation of the coating composition and improves the application characteristics of the coating composition.

Conversely optimizing binder resin characteristics for optimum film properties of coating compositions usually adversely affects the water miscibility or reducibility of the binder resin. This is especially true when the molecular weight of the binder is increased to improve film properties.

It is an object of this invention to provide an improved water reducible resin and method for making such resin which resin is a copolymer of an alkyd and vinyl polymers.

It is another object of this invention to provide a water reducible resin which is an alkyd and vinyl copolymer which resin may be used as a resin binder for coating compositions.

It is still another object of this invention to provide a water reducible alkyd vinyl copolymer resin binder for coating compositions which provide coatings which are fast air-drying, which rapidly develop water resistance and which improve film or coating properties.

It is yet another object of this invention to provide an improved coating composition.

These and other objects of the invention will become more apparent with reference to the following detailed description.

It has been found that alkyd vinyl copolymer resins which have an acid number or value in the range of from about 30 to about 70, which are a reaction product of an alkyd resin having an acid number or value in the range of from about 30 to about 70, preferably from about 40 to about 60, and a vinyl resin having an acid number from about 30 to about 70, preferably from about 40 to about 60; the alkyd or vinyl resin being polymerized in the presence of the other and each of the alkyd and vinyl resins having acid numbers within 50% of the acid number the alkyd vinyl copolymer resin, provides a water reducible alkyd vinyl resin. When the resin is incorporated into a coating composition, the coating composition is fast air-drying, rapidly develops water resistance and exhibits desirable film characteristics.

The reaction mixture for the alkyd vinyl copolymer resin comprises from about 10 to about 90 percent by weight alkyd resin and from about 10 to about 90 percent by weight vinyl resin, the weight percents based upon the total weight of the monomers and initiator which are reacted to provide the copolymer resin. The vinyl resin is the reaction product of sufficient vinyl carboxylic acid monomer to provide the vinyl resin made with such vinyl carboxylic acid monomer with an acid value of from about 30 to about 70;

a polymerizable monomer, which is not a carboxylic acid, having a polymerizable vinyl double bond and a molecular weight of less than about 5,000; and from about 1 to about 10 percent by weight, based on the weight of the monomers and initiator in the reaction for the vinyl resin, of a free radical or ionic initiator for the polymerization of the vinyl monomers, a free radical initiator being preferred.

As used herein vinyl means the unsaturated radical $CH_2=CH-$. The vinyl carboxylic acid is any carboxylic acid which includes the vinyl radical such as mono methyl maleate, mono butyl itaconate and para vinyl benzoic acid. Preferably the vinyl carboxylic acid has the general formula

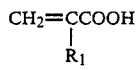

wherein $R_1$ = H or lower alkyl, where lower alkyl is an alkyl group which is linear or branched having one to and including four carbon atoms, with $R_1$ being H or methyl being most preferred.

The polymerizable non-carboxylic acid monomer is polymerizable by reaction at the vinyl group, preferred monomers being styrene and monomers with the general formula

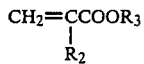

wherein
$R_2$ = H or methyl and
$R_3$ = an alkyl group which is a straight chain or branched chain having from one to about eighteen carbon atoms. Most preferably $R_3$ has one to four carbon atoms and/or the non-carboxylic acid monomer is styrene.

Generally the reaction mixture for the vinyl resin will have from about 4 to about 35 parts by weight carboxylic acid monomers, based upon the total weight of the monomers and initiator in the reaction for the vinyl resin with 4 to 15 being preferred. The reaction mixture for the vinyl resin will have from about 65 to 96 parts by weight, based upon the total weight of the monomers and initiator in the reaction for the vinyl resin, non-carboxylic acid monomer with 85 to 96 being preferred.

The alkyd resin generally is a reaction product of from about 15 to 37 percent by weight, based upon the weight of the monomers which are reacted to make the alkyd resin, of a polyol containing at least two hydroxyl groups per molecule, such as ethylene glycol, propylene glycol, 1,3-butylene glycol, pentanediol, neopentyl glycol, hexylene glycol, diethylene glycol, dipropylene glycol, triethylene glycol, glycerol, triemethylol propane, pentaerythritol, methylglucoside, dipentaerythritol, sorbitol and trimethylol ethane; and from about 50 to about 75 percent by weight, based upon the weight of the monomers which are reacted to make the alkyd resin, of drying oil derived fatty acids such as vegetable oil fatty acids or fish oil fatty acids which include dehydrated caster oil fatty acid, soya oil fatty acid, tall oil fatty acid, tung oil fatty acid, linseed oil fatty acid, safflower oil fatty acid, sunflower oil fatty acid, oiticica oil fatty acid, sardine oil fatty acid, menhaden oil fatty acid and mixtures thereof. Other monocarboxylic acids may be added to adjust the properties of the alkyd.

Preferably the alkyd resin is a reaction product of the polyol, oil fatty acid as well as not more than 22 percent by weight, based upon the weight of the monomers which are reacted to make the alkyd resin of a dibasic acid or acid anhydride thereof, and not more than 22 percent by weight, based upon the weight of the monomers which are reacted to make the alkyd resin, of a tricarboxylic acid or acid anydride thereof, such as trimelletic acid or anhydride. Additionally the reaction mixture for the alkyd also may have not more than 22 percent by weight, based upon the weight of the monomers which are reacted to make the alkyd resin, of a monobasic carboxylic acid having between 6 and 24 carbon atoms.

Preferably the polyol is neopentyl glycol, trimethylol ethane, trimethylol propane or mixtures thereof and most preferably is trimethylol propane.

The alkyd vinyl copolymer resin of the invention contains solubilizing carboxyl groups. While not intending to be bound by any theory, it is believed that the resin of the invention has solubilizing carboxyl groups selectivity distributed among the alkyd resin and vinyl resin which comprise the alkyd vinyl copolymer resin. Moreover it is believed that the method of making the alkyd vinyl copolymer resin provides the resin with the unique selective distribution which gives the resin its water miscibility. Further, it has been found that alkyd resins and vinyl resins of the type described herein which are merely blended, as opposed to obtaining the alkyd vinyl resin by a reaction of the constituent resins according to the invention, are incompatible such that the blend separates upon standing. It is believed that carboxyl deficient resins, or portions thereof which are carboxyl deficient, are less miscible in water and cause poor handling properties of the resin or coating composition which includes the resin.

A generally even distribution of carboxyl groups among resins making up the copolymer resin minimizes the amount of copolymer resin with insufficient carboxyl groups for solubilization. Moreover the incompatibility of the alkyd and vinyl resins, which is probably due to structural dissimilarities, is minimized by the invention which is believed to provide a copolymer resin with evenly distributed carboxyl groups among its alkyd and vinyl resin components. This increases structural similarity and homogeneity of the alkyd and vinyl components which aids in one component solubilizing the other and improves overall water miscibility.

In the preferred form of the invention the alkyd resin is prepared with reaction temperatures not exceeding 475° F. and the alkyd having a final acid value in the range of from about 40 to about 60 on solids. Preferably the product will have a Gardner-Holdt viscosity in the range of from about Z1 to about Z2 at 80.0% non-volatiles in xylene. In the preferred form of the invention, after the preparation of the alkyd resin, the vinyl resin is prepared in the presence of the alkyd resin, with the non-carboxylic acid vinyl monomers and the vinyl carboxylic acid monomers being premixed with an initiator, the premix then being added into an alkyd/organic solvent blend. In the preferred forms of the invention, the premix and alkyd/organic solvent blend then are reacted at about 300° F. for a period of time which assures a high degree of conversion of non-carboxylic acid vinyl and vinyl carboxylic acid monomers and final Gardner-Holdt viscosity in the range of from about Z5½ to about Z6½, at 70% non-volatiles at room temperature.

The alkyd vinyl copolymer binder of the invention may be thinned with from about 10 to about 50, 20 to 40 being preferred, parts by weight of volatile organic solvent such as butanol. A coating composition can then be made by grinding or dispersing from about 10 to about 25 parts by weight (based upon the weight of the coating composition) of the alkyd vinyl copolymer resin with pigments, solvents and metal driers, with a pigment to binder ratio of from about 0.05 to about 2.0.

The following examples are provided to illustrate the invention more fully, however, they should not be construed as limiting the scope of the invention, and many variations of the examples are contemplated.

EXAMPLE I

The alkyd vinyl copolymer resin is prepared using the following ingredients with "-water" indicating water being produced and lost as a result of the illustrated reactions.

|  |  | Parts |
|---|---|---|
| Alkyd Ingredients |  |  |
| (1) Dehydrated Castor Fatty Acids |  | 20.93 |
| (2) Trimethylol Propane |  | 9.39 |
|  |  | 30.32 |
| −Water |  | − 1.34 |
|  | Yield | 28.98 |
| (3) Isophthalic Acid |  | .57 |
|  |  | 29.55 |
| −Water |  | − .13 |
|  | Yield | 29.42 |
| (4) Trimellitic Anhydride |  | 6.04 |
|  |  | 35.46 |
| −Water |  | − .57 |
| Vinyl Ingredients |  |  |
| (5) Alkyd Yield |  | 34.89 |
| (6) Methacrylic Acid |  | 2.68 |
| (7) Methyl Methacrylate |  | 23.73 |
| (8) Butyl Methacrylate |  | 7.43 |
| (9) Dicumyl Peroxide (Dicup R) |  | 1.05 |
| (10) Dicumyl Peroxide Boosters |  | .31 |
| Copolymer Yield |  | 70.09 |
| (11) n-Propoxypropanol |  | 19.94 |
| (12) Secondary Butanol |  | 9.97 |
| Product Yield |  | 100.00 |

I. Preparation of the Alkyd Resin

A. 1 and 2 are charged to a clean dry reactor equipped with a fractionating column, total condenser and reflux return. The overhead is set so the vapors channel through a fractionalizing column to a total condenser. Agitation is begun with nitrogen sparge and the reactants are heated to 325° F. where the water of esterification starts to distill.

B. Heating is continued to 450° F. over a 3-4 hour period. The column temperature should not exceed 215° F.

C. 450° F. is held until an an acid value of less than five is reached. If the reaction is proceeding too slowly near the end of this step, the temperature may be slowly increased to 475° F. maximum and/or the sparge rate may be increased.

D. When an acid value of less than five is attained, the resin is cooled quickly to 375° F. The sparge rate is reduced if it was increased in step C.

E. Add 3 and heat to 450° F. over a 1-2 hour period.

F. When 450° F. is attained the temperature is stabilized and held at 450° F. until an acid value of less than five is obtained. If the acid value is decreasing too slowly, the temperature may be gradually increased to 475° F. maximum and/or the sparge rate may be increased.

G. When the acid value is less than five, the reaction is cooled rapidly to 375° F. and the sparge rate is reduced if increased in step F.

H. With the temperature stabilized at 375° F., 4 is added.

I. The reaction is held at 375° F. for final acid value of 48-52 (on solids) and a final viscosity of Z1-Z2 at 80.0% non-volatiles in xylene.

J. After the acid value is attained the reaction is cooled rapidly and filtered through a 100 micron cartridge.

II. Preparation of Vinyl Resin and Copolymer

A. 5 and 11 are charged into a reactor with a column and reflux return. The overhead is set so the vapors channel directly to the total condenser. With a light nitrogen blanket and moderate agitation, heating to 290° F. is begun.

B. 6, 7, 8, and 9 premixed being sure the monomers are well mixed and all of 9 is dissolved.

C. When the reactor temperature is stabilized at b 290° F., the mixture of monomers are added continuously at a constant rate over a three hour period.

D. After the monomers addition is complete, gentle heat is applied to slowly bring the reactor temperature to 290° F. over the next hour.

E. One hour after the monomers addition is complete and with the temperature stabilized at 290° F., 10 is added in portions.

F. The reactor is maintained at a temperature of 290° F. The boosters are added at a rate of 1/6 of the total amount of booster being added every hour for the next 5 hours.

G. The reactor is held at 290° F. for one hour after the addition of the sixth booster.

H. The viscosity and non-volatiles are sampled. The viscosity should be in the range Z5½ to Z6½ and the non-volatile should be in the range 76.6-77.8.

I. The reaction mixture is cooled to 210° F. and 90.0% of 12 is added and mixed well into the mixture. The remainder of 12 is used to adjust solids.

J. The reaction mixture is cooled to 175° F.

K. The product is filtered through a 100 micron cartridge.

The resulting alkyd vinyl copolymer resin has the following physical characteristics:

Gardner-Holdt Viscosity: Z6+
Acid Value (Solids Basis): 47.2
% Non-Volatiles: 70.5
Gardner Color: 2
Appearance: Sparkling clear
Pounds per Gallon: 8.46

In respect to the reaction using the vinyl monomers 6, 7 and 8, it is important that these monomers are fresh. These monomers must not be exposed to temperatures above 100° F. as they will homopolymerize and their subsequent use will not yield a product with optimum performance.

EXAMPLE II

Using the general procedure for making the alkyd and vinyl resins in Example I, the following materials are reacted to obtain an alkyd vinyl copolymer resin.

| I. Preparation of The Alkyd Resin | | |
|---|---|---|
| Materials | Parts | Grams |
| Soy fatty acids | 60.00 | 2,280.0 |
| Trimethylol Propane | 26.91 | 1,022.6 |
| Isophthalic Acid | 1.62 | 61.6 |
| Trimelletic Anhydride | 17.30 | 657.4 |
|  | 105.83 | 4,021.5 |
| −Water | − 5.83 | − 221.5 |

| I. Preparation of The Alkyd Resin | | |
|---|---|---|
| | 100.00 | 3,800.0 |

The alkyd has the following physical characteristics:

| Appearance | Very bright and clear |
|---|---|
| Color | 10 |
| Viscosity (at 80% Non-Volatiles in xylene) | Y¾ |
| Acid value | 48.8 |

II. Preparation of the Copolymer

Using the procedure for making the copolymer resin in Example I, the following materials are reacted to obtain the alkyd vinyl copolymer resin.

| Materials | Parts | Grams |
|---|---|---|
| Alkyd of Ex. II part I | 35.00 | 490.0 |
| Methacrylic Acid | 2.69 | 37.7 |
| Methyl Methacrylate | 23.81 | 333.3 |
| Butyl Methacrylate | 7.45 | 104.3 |
| Dicumyl Peroxide | 1.05 | 14.7 |
| n-Propoxypropanol | 20.00 | 280.0 |
| Secondary Butanol | 10.00 | 140.0 |
| | 100.00 | 1,400.0 |

The resulting alkyd vinyl copolymer resin has the following physical characteristics:
Appearance: Very bright and clear
Color: 5
Viscosity: 76
Acid value: 47.5
Non-Volatiles: 68.8
Pounds per gallon: 8.45

EXAMPLE III

Using the general procedure for making the alkyd and vinyl resins in Example I, the following materials are reacted to obtain an alkyd vinyl copolymer resin.

| I. Preparation of The Alkyd Resin | | |
|---|---|---|
| Materials | Parts | Grams |
| Dehydrated Castor Fatty Acids | 60.00 | 2,280.0 |
| Trimethylol Propane | 26.91 | 1,022.6 |
| Isophthalic Acid | 1.62 | 61.6 |
| Trimelletic Anhydride | 17.30 | 657.4 |
| | 105.83 | 4,021.5 |
| −Water | −5.83 | −221.5 |
| | 100.00 | 3,800.0 |

The alkyd has the following physical characteristics:
Appearance: Very bright and clear
Color: 4
Viscosity (at 80% Non-Volatiles in xylene): Z1¾
Acid value: 48.4

II. Preparation of the Copolymer

Using the procedure for making the copolymer resin in Example I, the following materials are reacted to obtain the alkyd vinyl copolymer resin.

| Materials | Parts | Grams |
|---|---|---|
| Alkyd of Ex. III part I | 35.00 | 490.0 |
| Methacrylic Acid | 2.69 | 37.7 |
| Methyl Methacrylate | 23.81 | 333.3 |
| Butyl Methacrylate | 7.45 | 104.3 |
| Dicumyl Peroxide | 1.05 | 14.7 |
| n-Propoxypropanol | 20.00 | 280.0 |
| Secondary Butanol | 10.00 | 140.0 |
| | 100.00 | 1,400.0 |

The resulting alkyd vinyl copolymer resin has the following physical characteristics:
Appearance: Very bright and clear
Color: 2
Viscosity: Z6¼
Acid value (solids basis): 46.3
Non-Volatiles: 69.1%
Pounds per gallon: 8.46

EXAMPLE IV

I. Preparation of the Alkyd Resin

The same alkyd is prepared as described in Example I.

II. Preparation of Copolymer

Using the materials described below, the copolymer resin is made as follows:

A. The alkyd of Example IV, Part I, and n-propoxypropanol are charged into a flask with a reflux column and are heated to 290° F. under a nitrogen blanket.

B. The methacrylic acid, methyl methacrylate, butyl methacrylate, dicumyl peroxide and styrene are separately premixed.

C. The premix is added to the heated mixture of step A over 3 hours while holding the temperature of the reaction mixture at 285° F. to 290° F.

D. The reaction is continued at 290° F. to substantially complete the conversion of monomer to polymer.

E. One hour after completing the premix addition, 0.74 grams of dicumyl peroxide, in addition to the 14.7 grams already added, is added to the reaction.

F. Step E is repeated five times at 1 hour intervals over five hours.

G. The reaction is continued for one hour after the peroxide addition.

H. The reaction is cooled to 200° F. and the secondary butanol is added.

I. Cooling is continued to 180° F., and the product is filtered and stored.

| Materials | Parts | Grams |
|---|---|---|
| Alkyd of Ex. IV part I | 35.00 | 49.0 |
| Methacrylic Acid | 2.69 | 37.7 |
| Methyl Methacrylate | 3.635 | 50.9 |
| Butyl Methacrylate | 6.625 | 92.7 |
| Styrene | 21.00 | 294.0 |
| Dicumyl Peroxide | 1.05 | 14.7 |
| n-Propoxypropanol | 20.00 | 280.0 |
| Secondary Butanol | 10.00 | 140.0 |

The resulting alkyd vinyl copolymer resin has the following physical characteristics:
Appearance: Very bright and clear
Color: 2
Viscosity: Z6¼
Acid value (solids): 45.8

Non-Volatiles: 70.3
Pounds per gallon: 8.31

Properties of Clear Film

The following properties of a clear film using the resin of Examples II and III were evaluated: dry time, water resistance and film appearance. Clear coating compositions having a pH in the range of 8.0 to 8.5, non-volatiles of 30.0% and which included the resin of Example II or Example III were compounded using water, ammonia, triethylamine, driers (Cobalt Intercar which contains 6% cobalt and Zirco Intercar which contains 6% zirconium), propoxypropanol and secondary butanol. The coating compositions had the following ingredients:

TABLE I

| Ingredient | Parts |
|---|---|
| Example II | 87.2 |
| PrOPrOH | 3.2 |
| 2-BuOH | 1.6 |
| 6% Co. Intercar | 1.0 |
| 6% Zr. Intercar | 1.0 |
| Triethylamine | 1.0 |
| NH₃ (28% acq) | 3.0 |
| H₂O (deionized) | 102.0 |
| Total | 200.0 |
| Example III | 86.8 |
| 2-BuOH | 1.7 |
| 6% Co. Intercar | 1.0 |
| 6% Zr. Intercar | 1.0 |
| Triethylamine | 1.0 |
| NH₃ (28% aq) | 3.0 |
| H₂O (deionized) | 102.0 |
| Total | 200.0 |

The results of the tests are shown in Tables II through V.

Table II

Solution Appearance

Very clear at pH 8.3
very bright and clear at pH 8.5

TABLE III

| | | Draw Down Evaluation | | | | |
|---|---|---|---|---|---|---|
| | STT* | 200** | 500*** | Pencil Hardness | Sward Hardness | Dry Appearance |
| Example II | 18 Min | 1:00 hr | 1:50 hr | 4B | 12 | Excellent |
| Example III | 10 Min | 1:00 | 3:30 | 4B | 10 | Excellent |

*Time to reach set to touch
**Time to pass 200 gr. Zapon tack test
***Time to pass 500 gr. Zapon tack test

TABLE IV

| | | | Evaluation of Film After One Week | | | |
|---|---|---|---|---|---|---|
| Ex. | Pencil Hardness | Sward Hardness | H₂O Resistance | VM & P* | 2-BuOH Resistance | Xylene Resistance | Appearance |
| II | 3BV | 16 | Good | | Destroyed film | Destroyed film | Excellent |
| III | F | 20 | Excellent | Excellent | Softened | | Very slight yellow |

*Varnish Markers & Painter Naphtha.

TABLE V

| Water Spot Resistance Test From Time Of Draw Down | | | | | | | |
|---|---|---|---|---|---|---|---|
| 15 Min. | :30 Min. | 1:00 Hr. | 2:00 | 3:00 | 4:00 | 5:00 | 6:00 |
| B | B | B | P | E | G | G | E |
| G | G | G | G | G | E | E | E |

B = Bad
P = Poor
E = Excellent
G = Good

It should be understood that while certain preferred embodiments of the present invention have been illustrated and described, various modifications thereof will become apparent to those skilled in the art. Accordingly, the scope of the present invention should be defined by the appended claims and equivalents thereof.

Various features of the invention are set forth in the following claims.

What is claimed is:

1. A water reducible alkyd vinyl copolymer resin having an acid value in the range of from about 30 to about 70, comprising the reaction product of from about 10 to about 90 percent by weight, based upon the weight of monomers and initiator which are reacted to provide the alkyd vinyl copolymer resin, of an alkyd resin which is the product of a polymerization reaction and which has an acid number in the range of from about 30 to about 70; and from about 10 to about 90 percent by weight, based upon the weight of monomers and initiator which are reacted to provide the alkyd vinyl copolymer resin, of a vinyl resin which has an acid number in the range of about 30 to about 70;

the vinyl resin being the reaction product of vinyl carboxylic acid monomer in an effective amount to provide the vinyl resin with an acid value in the range of from about 30 to about 70;

a non-carboxylic acid vinyl monomer having a polymerizable double bond and a molecular weight of about 5,000 or less; and from about 1 to about 10 percent by weight, based upon the weight of the monomers and initiator in the reaction for the vinyl resin, of a free radical or ionic initiator for the polymerization of the vinyl monomers, the vinyl resin and the alkyd resin each having acid numbers within 50 percent of the acid number of the alkyd vinyl copolymer resin, and the polymerization reaction for the alkyd resin being carried out in thepresence of the vinyl resin, or the reaction for the vinyl resin being carried out in the presence of the alkyd resin to provide the alkyd vinyl copolymer resin.

2. A water reducible alkyd vinyl copolymer resin as recited in claim 1, wherein the alkyd resin is the reaction product of from about 15 to about 37 percent by weight based upon the weight of the monomers which are reacted to make the alkyd resin, of polyol containing at least two hydroxyl groups per molecule, from about 50 to about 75 percent by weight, based upon the weight of the monomers which are reacted to make the alkyd resin, of a drying oil derived fatty acid; and wherein the vinyl carboxylic acid monomer comprises from about 4 to about 35 parts by weight, based on the total weight of the monomers and initiator in the reaction for the vinyl resin, and has the general formula $$CH_2=\underset{R_1}{\overset{|}{C}}CO_2H$$

wherein $R_1$ = H or lower alkyl, where lower alkyl is an alkyl group which is linear or branched having one to and including four carbon atoms, and the polymerizable non-carboxylic acid monomer comprises from about 65 to about 96 parts by weight, based on the total weight of the monomers and initiator in the reaction for the vinyl resin, and is styrene or monomers with the general formula $$CH_2=\underset{R_2}{\overset{|}{C}}COOR_3$$

wherein
$R_2$ = H or methyl and
$R_3$ = an alkyl group which is a straight chain or branched chain having from one to about eighteen carbon atoms, and
the initiator for the reaction of the vinyl monomers is a free radical initiator.

3. A water reducible alkyd vinyl copolymer resin as recited in claim 1 wherein the alkyd resin is the reaction product of from about 15 to about 37 percent by weight, based upon the weight of the monomers which are reacted to make the alkyd resin, of polyol containing at least two hydroxyl groups per molecule;

from about 50 to about 75 percent by weight, based upon the weight of the monomers which are reacted to make the alkyd resin, of a drying oil derived fatty acid selected from the group consisting of dehydrated castor oil fatty acid, soya oil fatty acid, tall oil fatty acid, tung oil fatty acid, linseed oil fatty acid, safflower oil fatty acid, sunflower oil fatty acid, oiticica oil fatty acid, sardine oil fatty acid, menhaden oil fatty acid or mixtures thereof;

not more than about 22 percent by weight, based upon the weight of the monomers which are reacted to make the alkyd resin, of a dibasic acid or acid anhydride thereof;

not more than 22 percent by weight, based upon the weight of the monomers which are reacted to make the alkyd resin, of a tricarboxylic acid or acid anhydride thereof;

not more than about 22 percent by weight, based upon the weight of the monomers which are reacted to make the alkyd resin, of a monobasic carboxylic acid having between 6 and 24 carbon atoms; and wherein the vinyl carboxylic acid monomer comprises from about 4 about 35 parts by weight, based on the total weight of the monomers and initiator in the reaction for the vinyl resin, and has the general formula $$CH_2=\underset{R_1}{\overset{|}{C}}CO_2H$$

wherein $R_1$ = H or lower alkyl, where lower alkyl is an alkyl group which is linear or branched having one to and including four carbon atoms, and the polymerizable non-carboxylic acid monomer comprises from about 65 to about 96 parts by weight, based on the total weight of the monomers and initiator in the reaction for the vinyl resin, and is styrene or monomers with the general formula $$CH_2=\underset{R_2}{\overset{|}{C}}COOR_3$$

wherein
$R_2$ = H or methyl and
$R_3$ = an alkyl group which is a straight chain or branched chain having from one to about eighteen carbon atoms, and
the initiator for the reaction of the vinyl monomers is a free radical initiator.

4. A water reducible alkyd vinyl resin as recited in claim 2 wherein the polyol is selected from the group consisting of neopentyl glycol, trimethylol ethane, trimethylol propane or mixtures thereof.

5. A water reducible alkyd vinyl resin as recited in claim 3 wherein the polyol is selected from the group consisting of neopentyl glycol, trimethylol ethane, trimethylol propane or mixtures thereof.

6. A water reducible alkyd vinyl resin as recited in claim 4 wherein the drying oil derived fatty acid is dehydrated castor oil fatty acid, the non-carboxylic acid vinyl monomers are selected from the group consisting of methyl methacrylate, butyl methacrylate, styrene or mixtures thereof, and the vinyl carboxylic acid monomer is methacrylic acid.

7. A water reducible alkyd vinyl resin as recited in claim 5 wherein the drying oil derived fatty acid is dehydrated castor oil fatty acid, the non-carboxylic acid vinyl monomers comprise from about 85 to about 96 parts by weight based on the total weight of the monomers and initiator in the reaction for the vinyl resin and are selected from the group consisting of methyl methacrylate, butyl methacrylate, styrene or mixtures thereof, the vinyl carboxylic acid monomer comprises from about 4 to about 15 parts by weight based on the total weight of monomers and initiator in the reaction for the vinyl resin and is methacrylic acid, the dibasic acid or anhydride thereof is selected from the group consisting of isophthalic acid or the anhydride thereof, terephthalic acid or the anhydride thereof, phthalic acid or the anhydride thereof, and mixtures thereof, or the tricarboxylic acid or anhydride thereof is trimelletic acid or the anhydride thereof.

8. A water reducible alkyd vinyl resin as recited in claim 7 wherein the dibasic acid or the anhydride thereof is isophthalic acid or the anhydride thereof.

9. A water reducible alkyd vinyl resin as recited in claim 8 wherein the free radical initiator is dicumyl peroxide.

10. A water reducible alkyd vinyl resin as recited in claims 1, 2, 3, 4, 5, 6, 7, 8 or 9 wherein the reaction for the vinyl resin is carried out in the presence of the alkyd resin to provide the alkyd vinyl copolymer resin.

11. A method of making a water reducible alkyd vinyl copolymer resin having an acid value in the range of from about 30 to about 70, comprising reaction of from about 10 to about 90 percent by weight, based upon the weight of monomers and initiator which are reacted to provide the alkyd vinyl copolymer resin, of an alkyd resin which is the product of a polymerization reaction and which has an acid number in the range of from about 30 to about 70; and from about 10 to about 90 percent by weight, based upon the weight of monomers and initiator which are reacted to provide the alkyd vinyl copolymer resin, of a vinyl resin which has an acid number in the range of about 30 to about 70;

the vinyl resin being the reaction product of vinyl carboxylic acid monomer in an effective amount to provide the vinyl resin with an acid value in the range of from about 30 to about 70;

a non-carboxylic acid vinyl monomer having a polymerizable double bond and a molecular weight of about 5,000 or less; and from about 1 to about 10 percent by weight, based upon the weight of the monomers and initiator in the reaction for the vinyl resin, of a free radical or ionic initiator for the polymerization of the vinyl monomers, the vinyl resin and the alkyd resin each having acid numbers within 50 percent of the acid number of the alkyd vinyl copolymer resin, and the polymerization reaction for the alkyd resin being carried out in the presence of the vinyl resin, or the reaction for the vinyl resin being carried out in the presence of the alkyd resin to provide the alkyd vinyl copolymer resin.

12. A method of making a water reducible alkyd vinyl copolymer resin as recited in claim 11, wherein the alkyd resin is the reaction product of from about 15 to about 37 percent by weight, based upon the weight of the monomers which are reacted to make the alkyd resin, of polyol containing at least two hydroxyl groups per molecule, from about 50 to about 75 percent by weight, based upon the weight of the monomers which are reacted to make the alkyd resin, of a drying oil derived fatty acid, and wherein the vinyl carboxylic acid monomer comprises from about 4 to about 35 parts by weight, based on the total weight of the monomers and initiator in the reaction for the vinyl resin, and has the general formula

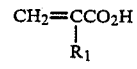

wherein $R_1 = H$ or lower alkyl, where lower alkyl is an alkyl group which is linear or branched having one to and including four carbon atoms, and the polymerizable non-carboxylic acid monomer comprises from about 65 to about 96 parts by weight, based on the total weight of the monomers and initiator in the reaction for the vinyl resin, and is styrene or monomers with the general formula

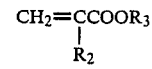

wherein $R_2 = H$ or methyl and $R_3 =$ an alkyl group which is a straight chain or branched chain having from one to about eighteen carbon atoms, and the initiator for the reaction of the vinyl monomers is a free radical initiator.

13. A method of making a water reducible vinyl alkyd copolymer resin as recited in claim 11 wherein the alkyd resin is the reaction product of from about 15 to about 37 percent by weight, based upon the weight of the monomers which are reacted to make the alkyd resin, of polyol containing at least two hydroxyl groups per molecule;

from about 50 to about 75 percent by weight, based upon the weight of the monomers which are reacted to make the alkyd resin, of a drying oil derived fatty acid selected from the group consisting of dehydrated castor oil fatty acid, soya oil fatty acid, tall oil fatty acid, tung oil fatty acid, linseed oil fatty acid, safflower oil fatty acid, sunflower oil fatty acid, oiticica oil fatty acid, sardine oil fatty acid, menhaden oil fatty acid or mixtures thereof;

not more than about 22 percent by weight, based upon the weight of the monomers which are reacted to make the alkyd resin, of a dibasic acid or acid anhydride thereof;

not more than 22 percent by weight, based upon the weight of the monomers which are reacted to make the alkyd resin, of a tricarboxylic acid or acid anhydride thereof;

not more than about 22 percent by weight, based upon the weight of the monomers which are reacted to make the alkyd resin, of a monobasic carboxylic acid having between 6 and 24 carbon atoms; and wherein the vinyl carboxylic acid monomer comprises from about 4 to about 35 parts by weight, based on the total weight of the monomers and initiator in the reaction for the vinyl resin, and has the general formula

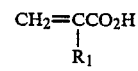

wherein $R_1 = H$ or lower alkyl, where lower alkyl is an alkyl group which is linear or branched having one to and including four carbon atoms, and the polymerizable non-carboxylic acid monomer comprises from about 65 to about 96 parts by weight, based on the total weight of the monomers and initiator in the reaction for the vinyl resin and is styrene or monomers with the general formula $$CH_2=CCOOR_3 \atop R_2$$

wherein
$R_2 = H$ or methyl and
$R_3 =$ an alkyl group which is a straight chain or branched chain having from one to about eighteen carbon atoms, and
the initiator for the reaction of the vinyl monomers is a free radical initiator.

14. A method of making a water reducible alkyd vinyl resin as recited in claim 12 wherein the polyol is selected from the group consisting of neopentyl glycol, trimethylol ethane, trimethylol propane or mixtures thereof.

15. A method of making a water reducible alkyd vinyl resin as recited in claim 13 wherein the polyol is selected from the group consisting of neopentyl glycol, trimethylol ethane, trimethylol propane or mixtures thereof.

16. A method of making a water reducible alkyd vinyl resin as recited in claim 14 wherein the drying oil derived fatty acid is dehydrated castor oil fatty acid, the non-carboxylic acid vinyl monomers are selected from the group consisting of methyl methacrylate, butyl methacrylate, styrene or mixtures thereof, and the vinyl carboxylic acid monomer is methacrylic acid.

17. A method of making a water reducible alkyd vinyl resin as recited in claim 15 wherein the drying oil derived fatty acid is dehydrated castor oil fatty acid, the non-carboxylic acid vinyl monomers comprises from about 85 to about 96 parts by weight based on the total weight of the monomers and initiator in the reaction for the vinyl resin and are selected from the group consisting of methyl methacrylate, butyl methacrylate, styrene or mixtures thereof, the vinyl carboxylic acid monomer comprises from about 4 to about 15 parts by weight based on the total weight of the monomers and initiator in the reaction for the vinyl resin and is methacrylic acid, the dibasic acid or anhydride thereof is selected from the group consisting of isophthalic acid or the anhydride thereof, terephthalic acid or the anhydride thereof, phthalic acid or the anhydride thereof, or mixtures thereof, and the tricarboxylic acid or anhydride thereof is trimelletic acid or the anhydride thereof.

18. A method of making a water reducible alkyd vinyl resin as recited in claim 17 wherein the dibasic acid or the anhydride thereof is isophthalic acid or the anhydride thereof.

19. A method of making a water reducible alkyd vinyl resin as recited in claim 18 wherein the free radical initiator is dicumyl peroxide.

20. A method of making a water reducible alkyd vinyl resin as recited in claims 11, 12, 13, 14, 15, 16, 17, 18 or 19 wherein the reaction for the vinyl resin is carried out in the presence of the alkyd resin to provide the alkyd vinyl copolymer resin.

21. A coating composition comprising: at least one pigment;
water; and
a water reducible alkyd vinyl copolymer resin having an acid value in the range of from about 30 to about 70, comprising the reaction product of
from about 10 to about 90 percent by weight, based upon the weight of monomers and initiator which are reacted to provide the alkyd vinyl copolymer resin, of an alkyd resin which is the product of a polymerization reaction and which has an acid number in the range of from about 30 to about 70; and
from about 10 to about 90 percent by weight, based upon the weight of monomers and initiator which are reacted to provide the alkyd vinyl copolymer resin, of a vinyl resin which has an acid number in the range of about 30 to about 70;
the vinyl resin being the reaction product of
vinyl carboxylic acid monomer in an effective amount to provide the vinyl resin with an acid value in the range of from about 30 to about 70;
a non-carboxylic acid vinyl monomer having a polymerizable double bond and a molecular weight of about 5,000 or less; and
from about 1 to about 10 percent by weight, based upon the weight of the monomers and initiator in the reaction for the vinyl resin, of a free radical or ionic initiator for the polymerization of the vinyl monomers,
the vinyl resin and the alkyd resin each having acid numbers within 50 percent of the acid number of the alkyd vinyl copolymer resin, and the polymerization reaction for the alkyd resin being carried out in the presence of the vinyl resin, or the reaction for the vinyl resin being carried out in the presence of the alkyd resin to provide the alkyd vinyl copolymer resin.

22. A coating composition as recited in claim 21, wherein the alkyd resin is the reaction product of
from about 15 to about 37 percent by weight, based upon the weight of the monomers which are reacted to make the alkyd resin, of polyol containing at least two hydroxyl groups per molecule,
from about 50 to about 75 percent by weight, based upon the weight of the monomers which are reacted to make the alkyd resin, of a drying oil derived fatty acid; and wherein
the vinyl carboxylic acid monomer comprises from about 4 to about 35 parts by weight, based on the total weight of the monomers and initiator in the reaction for the vinyl resin, and has the general formula $$CH_2=CCO_2H \atop R_1$$

wherein $R_1 = H$ or lower alkyl, where lower alkyl is an alkyl group which is linear or branched having one to and including four carbon atoms, and
the polymerizable non-carboxylic acid monomer comprises from about 65 to about 96 parts by weight, based on the total weight of the monomers and initiator in the reaction for the vinyl resin, and is styrene or monomers with the general formula $$CH_2=CCOOR_3 \atop R_2$$

wherein
$R_2 = H$ or methyl and
$R_3 =$ an alkyl group which is a straight chain or branched chain having from one to about eighteen carbon atoms, and the initiator for the reaction of the vinyl monomers is a free radical initiator.

23. A coating composition as recited in claim 21 wherein the alkyd resin is the reaction product of
from about 15 to about 37 percent by weight, based upon the weight of the monomers which are reacted to make the alkyd resin, of polyol containing at least two hydroxyl groups per molecule;
from about 50 to about 75 percent by weight, based upon the weight of the monomers which are reacted to make the alkyd resin, of a drying oil derived fatty acid selected from the group consisting of dehydrated castor oil fatty acid, soya oil fatty acid, tall oil fatty acid, tung oil fatty acid, linseed oil fatty acid, safflower oil fatty acid, sunflower oil fatty acid, oiticica oil fatty acid, sardine oil fatty acid menhaden oil fatty acid or mixtures thereof;
not more than about 22 percent by weight, based upon the weight of the monomers which are reacted to make the alkyd resin, of a dibasic acid or acid anhydride thereof;
not more than about 22 percent by weight, based upon the weight of the monomers which are reacted to make the alkyd resin, of a tricarboxylic acid or acid anhydride thereof;
not more than about 22 percent by weight, based upon the weight of the monomers which are reacted to make the alkyd resin, of a monobasic carboxylic acid having between 6 and 24 carbon atoms; and wherein
the vinyl carboxylic acid monomer comprises from about 4 to about 35 parts by weight, based on the total weight of the monomers and initiator in the reaction for the vinyl resin, and has the general formula

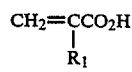

wherein $R_1$ = H or lower alkyl, where lower alkyl is an alkyl group which is linear or branched having one to and including four carbon atoms, and
the polymerizable non-carboxylic acid monomer comprises from about 65 to about 96 parts by weight, based on the total weight of the monomers and initiator in the reaction for the vinyl resin, and is styrene or monomers with the general formula

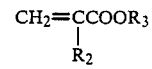

wherein
$R_2$ = H or methyl and
$R_3$ = an alkyl group which is a straight chain or branched chain having from one to about eighteen carbon atoms, and
the initiator for the reaction of the vinyl monomers is a free radical initiator.

24. A coating composition as recited in claim 22 wherein the polyol is selected from the group consisting of neopentyl glycol, trimethylol ethane, trimethylol propane and mixtures thereof.

25. A coating composition as recited in claim 23 wherein the polyol is selected from the group consisting of neopentyl glycol, propylene glycol, trimethylol propane or mixtures thereof.

26. A coating composition as recited in claim 24 wherein the drying oil derived fatty acid is dehydrated castor oil fatty acid, the non-carboxylic acid vinyl monomers are selected from the group consisting of methyl methacrylate, butyl methacrylate, styrene or mixtures thereof, and the vinyl carboxylic acid monomer is methacrylic acid.

27. A coating composition as recited in claim 25 wherein the drying oil derived fatty acid is dehydrated castor oil fatty acid, the non-carboxylic acid vinyl monomers comprises from about 85 to about 96 parts by weight on the total monomers and initiator in the reaction for the vinyl resin and are selected from the group consisting of methyl methacrylate, butyl methacrylate, styrene or mixtures thereof, the vinyl carboxylic acid monomer comprises from about 4 to about 15 parts by weight based on the total weight of the monomers and initiator in the reaction for the vinyl resin and is methacrylic acid, the dibasic acid or anhydride thereof is selected from the group consisting of isophthalic acid or the anhydride thereof, terephthalic acid or the anhydride thereof, phthalic acid or the anhydride thereof, or mixtures thereof, and the tricarboxylic acid or anhydride thereof is trimelletic acid or the anhydride thereof.

28. A coating composition as recited in claim 27 wherein the dibasic acid or the anhydride thereof is isophthalic acid or the anhydride thereof.

29. A coating composition as recited in claim 28 wherein the free radical initiator is dicumyl peroxide.

30. A coating composition as recited in claims 23, 24, 25, 26, 27, 28 or 29 wherein the reaction for the vinyl resin is carried out in the presence of the alkyd resin to provide the alkyd vinyl copolymer resin.

* * * * *

UNITED STATES PATENT AND TRADEMARK OFFICE
CERTIFICATE OF CORRECTION

PATENT NO. : 4,720,522

DATED : January 19, 1988

INVENTOR(S) : Roger A. Schmidt, et al.

It is certified that error appears in the above-identified patent and that said Letters Patent is hereby corrected as shown below:

Column 3, line 64, change "anydride" to --anhydride--.

Column 5, line 48, delete "an" (second occurrence).

Column 6, line 1, after "for" insert --a--;

line 16, after "at" delete "b"; and line 67, change "Trimelletic" to --Trimellitic--.

Column 7, lines 32-38, change

| " Appearance: Very bright and clear<br>Color: 5<br>Viscosity: 76<br>Acid value: 47.5<br>Non-Volatiles: 68.8<br>Pounds per gallon: 8.45 " | to | -- Appearance    Very bright and clear<br>Color            5<br>Viscosity        76<br>Acid value       47.5<br>Non-Volatiles    68.8<br>Pounds per gallon  8.45 --; | line 37, change "Non-Volatiles" to --% Non-Volatiles--; and line 53, change "Trimelletic" to --Trimellitic--.

Column 9, line 1, change "Non-Volatiles" to --% Non-Volatiles--; and line 24, change "(28% acq)" to --(28% aq)--.

UNITED STATES PATENT AND TRADEMARK OFFICE
CERTIFICATE OF CORRECTION

PATENT NO. : 4,720,522

DATED : January 19, 1988

INVENTOR(S) : Roger A. Schmidt, et al.

It is certified that error appears in the above-identified patent and that said Letters Patent is hereby corrected as shown below:

Column 10, line 51, change "thepresence" to --the presence".

Column 12, line 67, change "trimelletic" to --trimellitic--.

Column 15, line 47, change "trimelletic" to --trimellitic--.

Column 17, line 20, after "sardine oil fatty acid" insert --,-- (comma).

Column 18, line 16, change "and" to --or--;

line 32, after "weight" insert --based--; and line 44, change "trimelletic" to --trimellitic--.

Signed and Sealed this

Eleventh Day of June, 1991

Attest:

HARRY F. MANBECK, JR.

Attesting Officer

Commissioner of Patents and Trademarks